(12) United States Patent
Kong et al.

(10) Patent No.: US 11,512,223 B2
(45) Date of Patent: Nov. 29, 2022

(54) SURFACE COATING MATERIALS AND FILMS AND STACKED STRUCTURES AND DISPLAY DEVICES AND ARTICLES

(71) Applicant: Samsung Electronics Co., Ltd., Suwon-si (KR)

(72) Inventors: Hye Young Kong, Uijeongbu-si (KR); Byung Ha Park, Yongin-si (KR); Won Cheol Jung, Seoul (KR); Sung Hun Hong, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 307 days.

(21) Appl. No.: 16/818,201

(22) Filed: Mar. 13, 2020

(65) Prior Publication Data
US 2020/0332146 A1 Oct. 22, 2020

(30) Foreign Application Priority Data

Apr. 17, 2019 (KR) .................. 10-2019-0045025

(51) Int. Cl.
*C09D 171/02* (2006.01)
*C09D 5/00* (2006.01)
(Continued)

(52) U.S. Cl.
CPC ............ *C09D 171/02* (2013.01); *C03C 17/30* (2013.01); *C08G 65/336* (2013.01); *C09D 5/00* (2013.01);
(Continued)

(58) Field of Classification Search
CPC ...... C09D 171/02; C09D 5/00; C09D 171/00; C09D 4/00; C09D 7/40; C03C 17/30; C03C 2218/116; C03C 17/42; C08G 65/336; C08G 65/007; C08G 77/24; C08G 77/26; G06F 3/041; G06F 2203/04103; C08J 5/18; C08J 7/046
See application file for complete search history.

(56) References Cited

U.S. PATENT DOCUMENTS

| | | | |
|---|---|---|---|
| 8,236,406 B2 | 8/2012 | Koyama et al. | |
| 2009/0247691 A1* | 10/2009 | Kanega ............ | C08G 65/3355 524/544 |
| 2016/0032146 A1 | 2/2016 | Hozumi et al. | |

FOREIGN PATENT DOCUMENTS

| | | |
|---|---|---|
| JP | 2006-143302 A | 6/2006 |
| JP | 2007-314608 A | 12/2007 |
| JP | 2008-096781 A | 4/2008 |

* cited by examiner

*Primary Examiner* — Nathan L Van Sell
(74) *Attorney, Agent, or Firm* — Harness, Dickey & Pierce, P.L.C.

(57) ABSTRACT

A surface coating material includes a first material and a second material having a different structure. The first material includes a linking group represented by $*-(CF_2)_nO-*$ between two terminal ends, where one terminal end is a trifluoroalkoxy group and another terminal end is a silane group. The second material includes an oxyalkylene group or a $*-NH-*$ linking group between two terminal ends, where one terminal end is an alkoxy group or an amino group, and another terminal end is a silane group. The first material is included in the surface coating material in an amount of less than or equal to about 5 mol % relative to a total amount (100 mol %) of the first material and the second material in the surface coating material.

26 Claims, 8 Drawing Sheets

(51) Int. Cl.
 *C08G 65/336* (2006.01)
 *C03C 17/30* (2006.01)
 *G06F 3/041* (2006.01)
(52) U.S. Cl.
 CPC ........ *C03C 2218/116* (2013.01); *G06F 3/041* (2013.01); *G06F 2203/04103* (2013.01)

SURFACE COATING MATERIALS AND FILMS AND STACKED STRUCTURES AND DISPLAY DEVICES AND ARTICLES

CROSS-REFERENCE TO RELATED APPLICATION

This application claims priority to and the benefit of Korean Patent Application No. 10-2019-0045025 filed in the Korean Intellectual Property Office on Apr. 17, 2019, the entire contents of which are incorporated herein by reference.

BACKGROUND

1. Field

Surface coating materials, films, stacked structures, display devices, and articles are disclosed.

2. Description of the Related Art

Portable electronic devices such as smart phones or tablet PCs may include a functional layer having various functions. In particular, recently, as touch screen panels configured to recognize a contact position using a finger or a tool are universalized, a functional layer may be applied on the surface of a touch screen display panel in order to improve a surface slipping property and a sense of touch of a touch screen panel.

However, this functional layer has improved fingerprint visibility but deteriorated slip properties or improved slip properties but deteriorated fingerprint visibility, so that fingerprint visibility and slip properties may not be satisfied simultaneously.

SUMMARY

Some example embodiments provide a surface coating material having improved slip properties and fingerprint visibility.

Some example embodiments provide a film having improved slip properties and fingerprint visibility.

Some example embodiments provide a stacked structure including the film.

Some example embodiments provide a display device including the film or the stacked structure.

Some example embodiments provide an article coated with the surface coating material.

According to some example embodiments, a surface coating material includes a first material and a second material. The first material may include a linking group represented by Chemical Formula 1 between two terminal ends of the first material, where one terminal end of the two terminal ends of the first material is a trifluoroalkoxy group, and another terminal end of the two terminal ends of the first material is a silane group. The second material may include an oxyalkylene group or a *—NH—* linking group between two terminal ends of the second material, where one terminal end of the two terminal ends of the second material is an alkoxy group or an amino group, and another terminal end of the two terminal ends of the second material is a silane group. The first material may be included in the surface coating material in an amount of less than or equal to about 5 mol % relative to a total amount (100 mol %) of the first material and the second material in the surface coating material.

According to some example embodiments, a film may include a polymer of a first material and a polymer of a second material. The first material may include a linking group represented by Chemical Formula 1 between two terminal ends of the first material, where one terminal end of the two terminal ends of the first material is a trifluoroalkoxy group, and another terminal end of the two terminal ends of the first material is a silane group. The second material may include an oxyalkylene group or a *—NH—* linking group between two terminal ends of the second material, where one terminal end of the two terminal ends of the second material is an alkoxy group or an amino group, and another terminal end of the two terminal ends of the second material is a silane group. The first material may be included in the film in an amount of less than or equal to about 5 mol % relative to a total amount (100 mol %) of the first material and the second material in the film.

According to some example embodiments, a display device may include a display panel configured to display an image, and a film on an outer surface of the display panel. The film may include a first material and a second material. The first material may include a linking group represented by Chemical Formula 1 between two terminal ends of the first material, where one terminal end of the two terminal ends of the first material is a trifluoroalkoxy group, and another terminal end of the two terminal ends of the first material is a silane group. The second material may include an oxyalkylene group or a *—NH—* linking group between two terminal ends of the second material, where one terminal end of the two terminal ends of the second material is an alkoxy group or an amino group, and another terminal end of the two terminal ends of the second material is a silane group. The first material may be included in the film in an amount of less than or equal to about 5 mol % relative to a total amount (100 mol %) of the first material and the second material in the film.

The display device may further include a touch screen panel between the film and the display panel. An electronic device may include the display device.

An outer surface of the film may be substantially coplanar with one or more outer surfaces of the electronic device.

The one or more outer surfaces of the electronic device may be directly adjacent to the film such that the outer surface of the film and the one or more outer surfaces of the electronic device collectively define a substantially continuous surface.

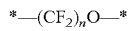    [Chemical Formula 1]

*—$(CF_2)_n$O—*

In Chemical Formula 1, n is an integer of 1 to 10.

The first material may be represented by Chemical Formula 2 and the second material may be represented by Chemical Formula 3.

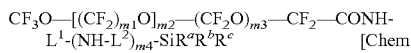    [Chemical Formula 2]

$CF_3O—[(CF_2)_{m1}O]_{m2}—(CF_2O)_{m3}—CF_2—CONH-$
$L^1-(NH-L^2)_{m4}-SiR^aR^bR^c$

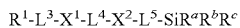    [Chemical Formula 3]

$R^1-L^3-X^1-L^4-X^2-L^5-SiR^aR^bR^c$ wherein, in Chemical Formula 2 and Chemical Formula 3, $L^1$, $L^2$, and $L^4$ are each independently a substituted or unsubstituted C1 to C20 alkylene group, $L^3$ is *—$L^aO$—*, wherein $L^a$ is a substituted or unsubstituted C1 to C20 alkylene group, or $L^3$ is a substituted or unsubstituted C1 to C20 alkylene group, $L^5$ is a single bond or a substituted or unsubstituted C1 to C20 alkylene group, $R^1$ is an unsubstituted C1 to C20 alkoxy group or an amino group, $X^1$ is *—NH—* or a single bond, $X^2$ is oxygen or a single bond, $R^a$, $R^b$, and $R^c$ are each independently hydrogen, a substituted or unsubstituted C1 to C20 alkoxy group, halogen, hydroxy group, amino group, a substituted or unsubstituted C1 to C20 alkyl group, a substituted or unsubstituted C6 to C20 aryl group, or a combination thereof, provided that at least one of $R^a$, $R^b$, or $R^c$ is a substituted or unsubstituted C1 to C20 alkoxy group, a halogen, or a hydroxy group, m1 is an integer of 2 or more, m2 and m3 are each independently an integer of 1 or more, and m4 is an integer of 0 or 1.

A weight average molecular weight of the first material may be greater than a weight average molecular weight of the second material.

The first material may have a weight average molecular weight of about 1,500 g/mol to about 7,000 g/mol and the second material may have a weight average molecular weight of about 400 g/mol to about 800 g/mol.

The surface coating material may include fluorine in greater than or equal to about 0.4 wt % relative to a total amount (100 wt %) of the first material and the second material in the surface coating material.

A chain length of the first material may be greater than a chain length of the second material.

The first material and the second material may each independently have a linear type structure.

The film may have a surface energy of greater than or equal to about 31 mN/m.

The film may have a thickness of about 1 nm to about 20 nm.

According to some example embodiments, a stacked structure including a substrate and the film is provided.

The substrate may be a ceramic or glass.

According to some example embodiments, a display device including the film or the stacked structure is provided.

According to some example embodiments, an article including a glass substrate coated with the surface coating material is provided.

The slip properties and fingerprint visibility of the functional layer may be improved simultaneously.

DETAILED DESCRIPTION

Figure 1:
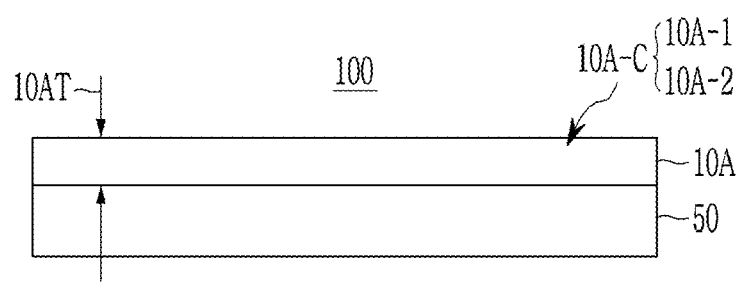
FIG. 1 is a cross-sectional view showing a display device according to some example embodiments.

Some example embodiments of the present disclosure will hereinafter be described in detail and may be easily performed by a person having an ordinary skill in the related art. However, actually applied structures may be embodied in many different forms, and is not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

In the drawings, parts having no relationship with the description are omitted for clarity of the embodiments, and the same or similar constituent elements are indicated by the same reference numeral throughout the specification.

As used herein, when a definition is not otherwise provided, "substituted" may refer to replacement of a hydrogen atom of a compound by a substituent of a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, or a combination thereof.

As used herein, when a definition is not otherwise provided, "hetero" may refer to one including 1 to 4 heteroatoms of N, O, S, Se, Te, Si, or P.

As used herein, when specific definition is not otherwise provided, indicates a point where the same or different atom (including a hydrogen atom) or Chemical Formula is linked.

Hereinafter, "combination" refers to a mixture of two or more and a stack structure of two or more.

Hereinafter, a surface coating material according to some example embodiments is described. The surface coating material may be interchangeably referred to herein as a composition.

A surface coating material according to some example embodiments includes a first material and a second material (e.g., a mixture thereof), wherein one terminal end of both (e.g., two) terminal ends of the first material is a trifluoroalkoxy group, the other terminal end is a silane group, and a linking group represented by Chemical Formula 1 is included between the both terminal ends, one of both terminal ends of the second material is an alkoxy group or an amino group, the other is a silane group, and an oxyalkylene group or a *—NH—* linking group is included between the both terminal ends, and the first material is included, in the surface coating material, in an amount of less than or equal to about 5 mol % relative to a total amount (100 mol %) of the first and second materials in the surface coating material. Restated, the first material may include a linking group represented by Chemical Formula 1 between two terminal ends of the first material, where one terminal end of the two terminal ends of the first material is a trifluoroalkoxy group, and another terminal end of the two terminal ends of the first material is a silane group, and the second material may include an oxyalkylene group or a *—NH—* linking group between two terminal ends of the second material, one terminal end of the two terminal ends of the second material is an alkoxy group or an amino group, and another terminal end of the two terminal ends of the second material is a silane group.

$$*-(CF_2)_nO-* \quad \text{[Chemical Formula 1]}$$

In Chemical Formula 1, n is an integer of 1 to 10.

Conventionally, a composition including a fluorine-containing silicon compound is often used as a surface coating material. When fluorine is contained within the compound included in the surface coating material, a coating layer (also referred to herein as a film) comprising the surface coating material may have a low surface friction coefficient and thus excellent slip properties, but since the coating layer has low surface energy, fingerprints are smudged on the surface and thus cause a diffuse reflection. In other words, since the coating layer formed by coating a surface coating material including the fluorine-containing silicon compound has too high an initial contact angle, the surface coating material including the fluorine-containing silicon compound has a problem of causing the diffuse reflection through a fingerprint smudge phenomenon, when fingerprints are put thereon, that is, a problem of deteriorating fingerprint visibility (e.g., fingerprints are more visible), and accordingly, a demand on the material in a market has recently been decreased. Accordingly, in order to improve the fingerprint visibility (e.g., decrease the visibility of fingerprints), there has been an attempt to use a nonfluorine-based silicon compound capable of providing a coating layer causing no surface diffuse reflection by increasing surface energy not to bear a fingerprint thereon as a surface coating material, but the non-fluorine-based silicon compound has a large surface friction coefficient and thus a problem of largely deteriorating performance in terms of slip properties, and a display treated with the surface coating material including the nonfluorine-based silicon compound and the like are worn out after about 2 months compared with the initial display surface, which is easily confirmed even with naked eyes.

However, the surface coating material according to some example embodiments includes a mixture of the fluorine-based silicon compound as a first material and the nonfluorine-based silicon compound as a second material and limits a mole ratio of the first material and second material and thus may greatly improve slip properties, fingerprint visibility, and durability of a coating layer (also referred to as "film") including the surface coating material according to some example embodiments based on including the mixture. It will be understood that "improved" or "excellent" fingerprint visibility, as described herein, refers to "reduced" visibility, to an observer via at least the visible wavelength ray region, of a fingerprint on the coating layer based on interaction of the coating layer with the fingerprint to cause the fingerprint (e.g., the material and/or residue that defines the fingerprint) to be less visible in at least the visible wavelength ray region to an external observer. It will be understood that improved and/or enhanced slip properties may refer to a surface of the surface coating material and/or a coating layer including the surface coating material and having a relatively low friction coefficient.

Figure 3:
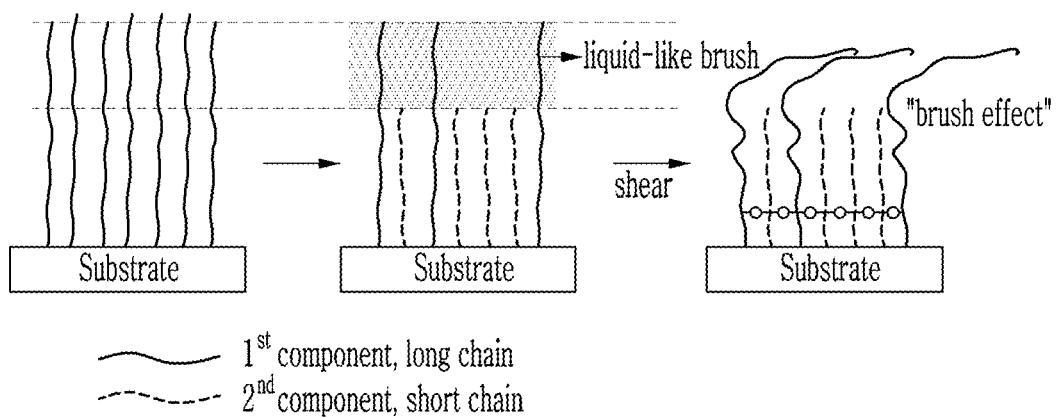
FIG. 3 is a schematic view showing the first and second materials in a film according to some example embodiments.

Specifically, since the first and second materials have particular structures represented by Chemical Formula 2 and Chemical Formula 3 and the first material is included in an amount of less than or equal to about 5 mol % relative to a total amount (100 mol %) of the first and second materials, a form that the first material may lie down on the second material (e.g., may at least partially fold over on the second material as shown in FIG. 3), that is, a self-assembled brush structure including the first and second materials may be realized, which may simultaneously improve fingerprint visibility and slip properties of a coating layer including the first and second materials. Referring to FIG. 3, the surface coating material, or film including same, according to some example embodiments, is disposed on a substrate, and when the first and second materials internally included in the surface coating material or film are examined, the first material having a long chain length (represented by Chemical Formula 3) lies down on the second material having a short chain length (represented by Chemical Formula 2), and accordingly, a brush effect is realized. Thus, in some example embodiments, the first material may be represented by Chemical Formula 2, and the second material may be represented by Chemical Formula 3.

$$CF_3O—[(CF_2)_{m1}O]_{m2}—(CF_2O)_{m3}—CF_2—CONH-L^1-(NH-L^2)_{m4}-SiR^aR^bR^c \quad \text{[Chemical Formula 2]}$$

$$R^1-L^3-X^1-L^4-X^2-L^5-SiR^aR^bR^c \quad \text{[Chemical Formula 3]}$$

In Chemical Formula 2 and Chemical Formula 3, $L^1$, $L^2$, and $L^4$ are each independently a substituted or unsubstituted C1 to C20 alkylene group, $L^3$ is $*-L^aO-*$, wherein $L^a$ is a substituted or unsubstituted C1 to C20 alkylene group, or $L^3$ is a substituted or unsubstituted C1 to C20 alkylene group, $L^5$ is a single bond or a substituted or unsubstituted C1 to C20 alkylene group, $R^1$ is an unsubstituted C1 to C20 alkoxy group or an amino group, $X^1$ is *—NH—* or a single bond, $X^2$ is oxygen or a single bond, $R^a$, $R^b$, and $R^c$ are each independently hydrogen, a substituted or unsubstituted C1 to C20 alkoxy group, halogen, hydroxy group, amino group, a substituted or unsubstituted C1 to C20 alkyl group, a substituted or unsubstituted C6 to C20 aryl group, or a combination thereof, provided that at least one of $R^a$, $R^b$, or $R^c$ is a substituted or unsubstituted C1 to C20 alkoxy group, a halogen, or a hydroxy group, m1 is an integer of 2 or more, m2 and m3 are each independently an integer of 1 or more, and m4 is an integer of 0 or 1.

In some example embodiments, a weight average molecular weight of the first material is greater than a weight average molecular weight of the second material. For example, the first material represented by Chemical Formula 2 may have a larger ("greater") weight average molecular weight than the second material represented by Chemical Formula 3, and accordingly, an interaction of the first material with the second material may be more easily made, and a brush structure where the first material lies down on the second material may be easily formed, which may greatly improve fingerprint visibility, slip properties, and durability of the substrate coated with the surface coating material according to some example embodiments.

In some example embodiments, the first material may have a weight average molecular weight of about 1,500 g/mol to about 7,000 g/mol and the second material may have a weight average molecular weight of about 400 g/mol to about 800 g/mol. When the first and second materials have weight average molecular weights of the ranges, durability of the surface coating material including the same may be further improved.

The first and second materials may have different weight average molecular weights and chain lengths depending on their structures and thus be used in a different mole ratio depending on the weight average molecular weights (chain lengths), but the first material may be included in an amount of less than or equal to about 5 mol % based on a total amount (100 mol %) of the first and second materials, in some example embodiments, the first and second materials should be used in a mole ratio of about 0.01:99.9 to about 5:95. When the first material is included in the surface coating material in an amount of greater than 5 mol % based on the total amount (100 mol %) of the first and second materials, the coating layer has lower surface energy than 31 mN/m of that of oleic acid, a main component of fingerprints, and accordingly, when the fingerprints put on the coating layer formed of the surface coating material, the fingerprints are smudged on the coating layer formed of the surface coating material and cause a diffuse reflection, and thereby, fingerprint visibility may be deteriorated, but when the first material is not included in the surface coating material at all or if included, included in an amount of less than about 0.01 mol % based on a total amount of (100 mol %) of the first and second materials, the surface friction coefficient of the coating layer formed of the surface coating material is increased, and thereby, slip properties may be deteriorated.

In some example embodiments, in Chemical Formula 2, $L^1$ may be a substituted or unsubstituted C1 to C10 alkylene group, $L^2$ may be a substituted or unsubstituted C11 to C20 alkylene group, m1 may be an integer of 2 to 10, and m3 may be an integer of 1 to 10.

In some example embodiments, in Chemical Formula 3, $R^1$ may be an unsubstituted C1 to C20 alkoxy group (e.g., methoxy group, ethoxy group, propoxy group, butoxy group, pentoxy group, etc.), $L^3$ may be a *-$L^a$O—*($L^a$ is a substituted or unsubstituted C1 to C10 alkylene group), $X^1$ may be a single bond, $L^4$ may be a substituted or unsubstituted C1 to C20 alkylene group, $X^2$ may be oxygen, and $L^5$ may be a substituted or unsubstituted C1 to C20 alkylene group.

In some example embodiments, in Chemical Formula 3, $R^1$ may be an amino group (e.g., *—$NH_2$, etc.), $L^3$ may be a substituted or unsubstituted C1 to C10 alkylene group, $X^1$ may be *—NH—*, $L^4$ may be a substituted or unsubstituted C1 to C10 alkylene group, $X^2$ may be a single bond, and $L^5$ may be a single bond.

When the first and second materials have the aforementioned structure respectively, the first material has a weight average molecular weight larger than the second material and has a longer chain, and thus the aforementioned brush effect may be realized much more easily (e.g., where the longer first material structure may at least partially fold and/or lay down on the shorter second material structure).

In some example embodiments, the surface coating material may include fluorine in an amount (e.g., weight) greater than or equal to about 0.4 wt % for example about 0.4 wt % to about 10.0 wt % relative to a total amount (e.g., total weight) (100 wt %) of the first and second materials in the surface coating material. In this case, fingerprint visibility and slip properties of a coating layer coated with the surface coating material according to some example embodiments may be improved simultaneously.

In some example embodiments, a chain length of the first material may be longer (e.g., greater) than a chain length of the second material.

In some example embodiments, the first material may be represented by Chemical Formula 2-1 or Chemical Formula 2-2.

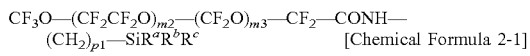
[Chemical Formula 2-1]

In Chemical Formula 2-1,
m2 is an integer of 2 to 10,
m3 is an integer of 1 to 10,
p1 is an integer of 1 to 10,
$R^a$, $R^b$, and $R^c$ are each independently hydrogen, a substituted or unsubstituted C1 to C20 alkoxy group, a halogen, a hydroxy group, or a substituted or unsubstituted C1 to C20 alkyl group.

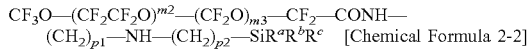
[Chemical Formula 2-2]

In Chemical Formula 2-2,
p2 is an integer of 1 to 20, for example an integer of 11 to 20,
m2, m3, p1, $R^a$, $R^b$, and $R^c$ are the same as described above.

In some example embodiments, the second material may be represented by Chemical Formula 3-1 or Chemical Formula 3-2.

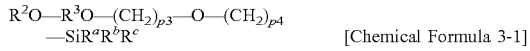
[Chemical Formula 3-1]

In Chemical Formula 3-1,
$R^2$ is a substituted or unsubstituted C1 to C10 alkyl group,
$R^3$ is a substituted or unsubstituted C1 to C10 alkylene group,
p3 and p4 are each independently an integer of 1 to 20, and
$R^a$, $R^b$, and $R^c$ are the same as described above.

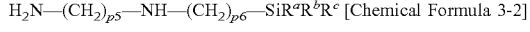 [Chemical Formula 3-2]

In Chemical Formula 3-2,
p5 and p6 are each independently an integer of 1 to 10, and
$R^a$, $R^b$, and $R^c$ are the same as described above.

In some example embodiments, the first and second materials may each independently have a linear type structure (e.g., a molecule and/or polymer of the first material and/or a molecule and/or polymer of the second material may be a linear molecule and/or polymer). When the first and second materials of the surface coating material have a branch-type structure independently including a substituent, slip properties on the substrate surface coated with the surface coating material to form a coating layer on the substrate may be deteriorated. Specifically, since materials having the branch-type structure may hardly realize a brush effect that a material having a long chain lies down on another material having a short chain, slip properties may be deteriorated.

In addition, a self-assembled brush structure of the first and second materials may firmly maintain an inter-chain interaction among adjacent molecular chains and thereby, reduce and/or prevent a bonding damage and/or destruction of the brush structure due to frequent frictions. Accordingly, a coating layer ("film") that includes the surface coating material may be reduced or prevented from being easily worn out by the frequent frictions and fortify durability.

The aforementioned surface coating material may be formed into a film (also referred to herein as a coating layer) on a substrate based on a coating (wet coating) through a solution process or by deposition through a dry process. Accordingly, the film may be a coated film or a deposited film. According to some example embodiments, a process of coating the surface coating material on a substrate, for example a glass substrate (glass plate) is provided. Specifically, the coated film may be obtained by coating a solution including the surface coating material dissolved or dispersed in a solvent, some example embodiments, in a method of spin coating, slit coating, inkjet printing, spray coating, or dipping and then, drying it. The deposited film may be obtained, some example embodiments, in a method of a thermal deposition, a vacuum deposition, or a chemical vapor deposition (CVD).

The film may be formed on a substrate and the substrate may be for example a ceramic or a glass plate, but is not limited thereto.

The film may include a condensation polymerization product of the aforementioned first material (e.g., a polymer of the first material) and a condensation polymerization product of the aforementioned second material (e.g., a polymer of the second material) and a condensation polymerization product of the first and second materials and the first material has a greater weight average molecular weight than the second material.

Herein, the hydrolyzable silane moieties ($*-SiR^aR^bR^c$) at the terminal ends of the first material represented by Chemical Formula 2 and the second material represented by Chemical Formula 3 are bounded to the substrate and the moieties represented by $*-CF_3O$ or $*-R^1$ at the opposite terminal ends are arranged on the surface (air) side. The first and second materials may each independently be arranged along a substantially vertical direction with respect to the substrate.

The condensation polymerization product of the first and second materials are the same as described above.

The film may have a surface energy of greater than or equal to about 31 mN/m. The surface energy of oleic acid that is a main component of human fingerprints is 31 mN/m and thus when the surface energy of the film is greater than or equal to about 31 mN/m, and thus equal to or greater than the surface energy of at least a main component of the fingerprints, a fingerprint may not grow on the film not to cause a surface diffuse reflection, such that the visibility of a fingerprint on the film may be reduced to render the fingerprint less visible to an external observer in at least the visible wavelength ray region.

The film may have a contact angle that is not too high by having the moiety represented by $*-CF_3O$ or $*-R^1$. Thus, good slip properties may be obtained. The film may have for example a contact angle of about 70° to about 85°. Herein, the contact angle may be measured by using a Sessile drop technique. Liquid used for measuring the contact angle may be water and a Drop shape analyzer (DSA100, KRUSS, Germany) is used to measure the contact angle based on dropping a particular (or, alternatively, predetermined) amount of water (about 3 ul) on the film.

The film including the composition may be configured to maintain association with a certain contact angle even after frequent rubbing. Durability of the film may be examined through a change of the contact angle after a plurality of frictions. In some example embodiments, the film may have a contact angle change of less than or equal to about 20° after the 5000 times' abrasion test with an eraser under a load of about 1 kg. In some example embodiments, the film may have a contact angle of about 60° to about 75° after the abrasion test with an eraser under a load of about 1 kg.

In some example embodiments, the film may be measured with respect to a contact angle by using not water but diiodomethane. Herein, in some example embodiments, the contact angle may be less than or equal about 60°, in some example embodiments, less than or equal about 59°, or less than or equal about 58° Herein, the contact angle may be measured by using a Sessile drop technique. Liquid used for measuring the contact angle may be water and a Drop shape analyzer (DSA100, KRUSS, Germany) is used to measure the contact angle based on dropping a particular (or, alternatively, predetermined) amount of water (about 2.7 ul) on the film.

The film may have a thickness of about 1 nm to about 20 nm, for example about 5 nm to about 20 nm.

The substrate and the film may form (e.g., define) a stacked structure.

The stacked structure may further include at least one layer between the substrate and the film.

The stacked structure may be a transparent film, for example a transparent flexible film.

In some example embodiments, the film or the stacked structure may be attached on a display panel. A display panel may be a device configured to display an image, for example based on emitting light and/or a pattern of light having one or more various wavelengths. Herein, the display panel and the film or the stacked structure may be directly bonded or may be bonded by interposing an adhesive. The display panel may be for example a liquid crystal panel or an organic light emitting panel, but is not limited thereto. The film or the stacked structure may be disposed on the side of an observer.

FIG. 1 is a cross-sectional view showing a display device according to some example embodiments.

Referring to FIG. 1, a display device 100 according to some example embodiments includes a display panel 50 and a functional film 10A. The functional film 10A may be any of the example embodiments of a film (also referred to as coating layer) including any example embodiments of the surface coating material as described herein, including a surface coating material 10A-C including any example embodiments of the first material 10A-1 and the second material 10A-2 as described herein.

The display panel 50 may be for example an organic light emitting panel or a liquid crystal panel, for example a bendable display panel, a foldable display panel, or a rollable display panel. In some example embodiments, the display panel 50 may be the substrate as described herein.

The functional film 10A may include the film or stacked structure as described herein with reference to any example embodiments and may be disposed on the side of an observer (e.g., between the display panel 50 and an exterior of the display device 100). Another layer may be further disposed between the display panel 50 and the functional film 10A and may include for example a monolayer or plural layers of polymer layer (not shown) and optionally a transparent adhesive layer (not shown). The functional film 10A may have a thickness 10AT of about 1 nm to about 20 nm, for example about 5 nm to about 20 nm.

Figure 2:
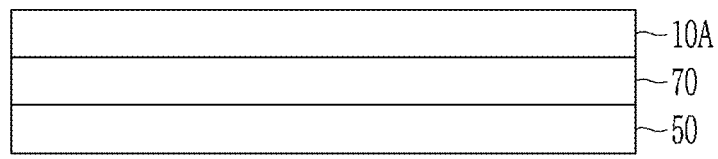
FIG. 2 is a cross-sectional view showing a display device according to some example embodiments.

FIG. 2 is a cross-sectional view of a display device according to some example embodiments.

Referring to FIG. 2, a display device 200 according to some example embodiments includes a display panel 50, a functional film 10A, and a touch screen panel 70 disposed between the display panel 50 and the functional film 10A.

The display panel 50 may be for example an organic light emitting panel or a liquid crystal panel, for example a bendable display panel, a foldable display panel, or a rollable display panel.

The functional film 10A may include the film or the stacked structure and may be disposed on the side of an observer.

The touch screen panel 70 may be disposed adjacent to each of the functional film 10A and the display panel 50 to configure the touch screen panel 70 to recognize the touched position and the position change when is touched by a human hand or an object through the functional film 10A and then to output a touch signal (e.g., to a processor of the display device 200 and/or a processor of an electronic device that includes the display device 200). The driving module (not shown) may monitor a position where is touched from the output touch signal; recognize an icon marked at the touched position, and control to carry out functions corresponding to the recognized icon, and the function performance results are displayed on the display panel 50. In some example embodiments, the touch screen panel 70 may be the substrate as described herein. In some example embodiments, a combination of the touch screen panel 70 and the display panel 50 may be the substrate as described herein.

Another layer may be further disposed between the touch screen panel 70 and functional film 10A and may include for example a monolayer or plural layers of polymer layer (not shown) and optionally a transparent adhesive layer (not shown).

Another layer may be further interposed between the touch screen panel 70 and the display panel 50 and may include for example a monolayer or plural layers of polymer layer (not shown) and optionally a transparent adhesive layer (not shown).

The functional film 10A including the aforementioned film or stacked structure may be applied to (e.g., included in) a variety of electronic devices such as a display device, for example a smart phone, a tablet PC, a camera, a touch screen device, and so on, but is not limited thereto.

Some example embodiments provide an article manufactured by coating the aforementioned surface coating material on a substrate, in some example embodiments, a glass substrate (a glass plate). Herein, the article may include a mobile display device, an automotive display, a sensor, an optical article, and the like but is not limited thereto.

Figure 4A:
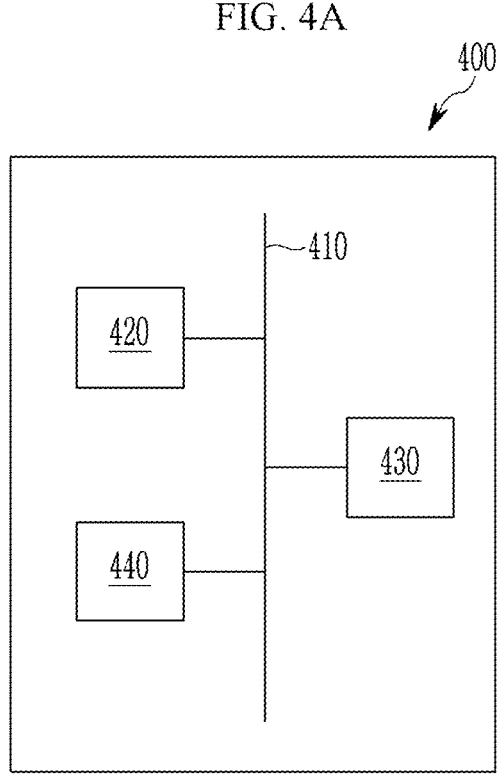
FIG. 4A is a schematic diagram of an electronic device according to some example embodiments.

FIG. 4A is a schematic diagram of an electronic device 400 according to some example embodiments.

As shown in FIG. 4A, an electronic device 400 may include a processor 420, a memory 430, and a display device 440 that are electrically coupled together via a bus 410. The display device 440 may be a display device any of the example embodiments as described herein (e.g., display device 100 and/or display device 200), including a display device including at least a display panel and a film that includes any of the example embodiments of compositions described herein. The memory 430, which may be a non-transitory computer readable medium, may store a program of instructions. The processor 420 may execute the stored program of instructions to perform one or more functions. For example, the processor 420 may be configured to process electric signals generated by the display device 440. The processor 420 may be configured to generate an output (e.g., an image to be displayed on the display device 440) based on processing the electric signals.

Figure 4B:
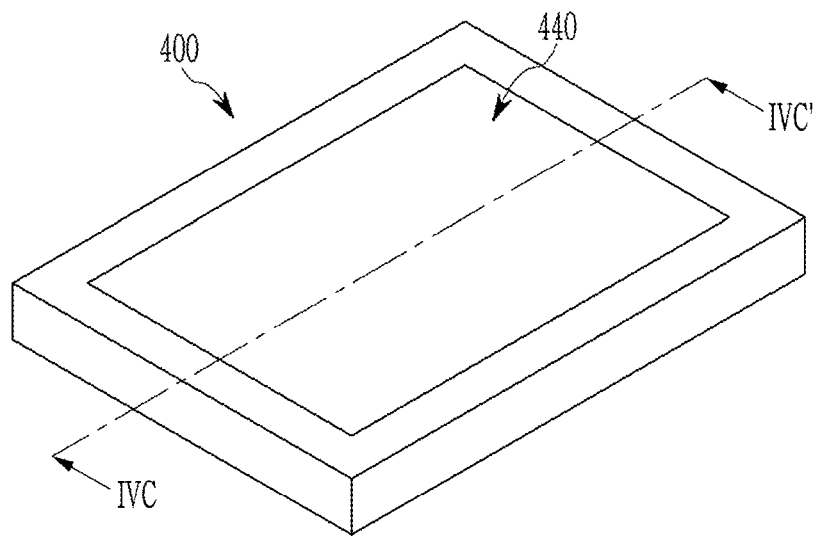
FIG. 4B is a perspective view of an electronic device according to some example embodiments.
Figure 4C:
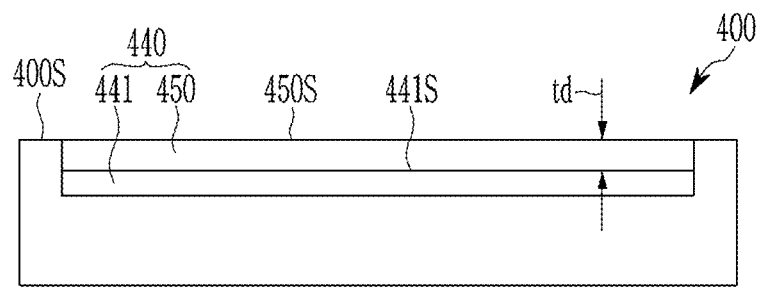
FIG. 4C is a cross-sectional view, along view line IVC-IVC' of FIG. 4B, of the electronic device of FIG. 4B according to some example embodiments.

FIG. 4B is a perspective view of an electronic device 400 according to some example embodiments. FIG. 4C is a cross-sectional view, along view line IVC-IVC' of FIG. 4B, of the electronic device 400 of FIG. 4B according to some example embodiments. The electronic device 400 shown in FIGS. 4B-4C may be the electronic device 400 shown in FIG. 4A.

As shown in FIGS. 4B-4C, an electronic device 400 may include a display device 440 that includes a display panel 441 and a film 450 on the display panel 441. The film 450 may be partially or completely transparent in at least some or all of the visible wavelength ray regions and/or some or all non-visible wavelength ray regions, such that the display panel 441 may be partially or completely observable from an exterior of the electronic device 400 through the film 450. As shown in FIG. 4C, the display device 440 may be configured such that the outer surface 450S of the film 450 is coplanar ("flush") or substantially coplanar ("substantially flush") (e.g., coplanar within manufacturing tolerances and/or material tolerances) with one or more outer surfaces 400S of the electronic device 400, including one or more outer surfaces 400S that may be directly adjacent to the outer surface 450S so that the outer surface 450S and the one or more outer surfaces 400S collectively define a continuous or substantially continuous (e.g., continuous within manufacturing tolerances and/or material tolerances) surface of at least a portion of the electronic device 400. As shown, the display device 440 is configured to cause the outer surface 450S to be coplanar or substantially coplanar with the one or more outer surfaces 400S based on the display panel 441 being inset into the volume space defined by the outer surfaces 400S of the electronic device 400 by an inset distance "td" that matches or substantially matches (e.g., matches within manufacturing tolerances and/or material tolerances) the thickness of the film 450, as shown in FIG. 4C.

As shown in FIG. 4C, the display device 440 may have all of the features of the display device 100 shown in FIG. 1, where the film 450 may have all of the features of functional film 10A and the display panel 441 may have all of the features of display panel 50. It will also be understood that, in some example embodiments, the display device 440 may have all of the features of the display device 200 shown in FIG. 2, where the film 450 may have all of the features of functional film 10A, the display panel 441 may have all of the features of display panel 50, and the display device 440 may further include a touch screen panel 70 interposing between the display panel 441 and the film 450, where the display panel 441 may be inset into the volume space defined by the outer surfaces 400S of the electronic device 400 by an inset distance "td" that matches or substantially matches (e.g., matches within manufacturing tolerances and/or material tolerances) the combined thickness of the film 450 and the touch screen panel 70, and the touch screen panel 70 may be inset into the volume space defined by the outer surfaces 400S of the electronic device 400 by an inset distance that matches or substantially matches (e.g., matches within manufacturing tolerances and/or material tolerances) the thickness of the film 450.

While FIG. 4C shows example embodiments where the outer surface 450S is coplanar or substantially coplanar with a one or more outer surfaces 400S of the electronic device 400, it will be understood that example embodiments are not limited thereto. For example, in some example embodiments, an outer surface 441S of the display panel 441 or touch screen panel 70 of the display device 440 may be coplanar or substantially coplanar with the one or more outer surfaces 400S of the electronic device 400, such that the outer surface 450S of the film 450 protrudes outward from a plane defined by the one or more outer surfaces 400S of the electronic device 400 by a distance corresponding to the thickness of the film 450.

Figure 5A:
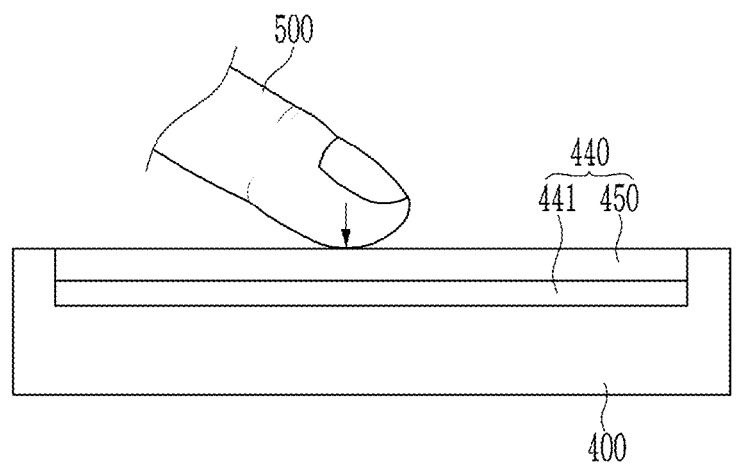
FIG. 5A is a cross-sectional view, along view line IVC-IVC' of FIG. 4B, of the electronic device of FIG. 4B according to some example embodiments.
Figure 5B:
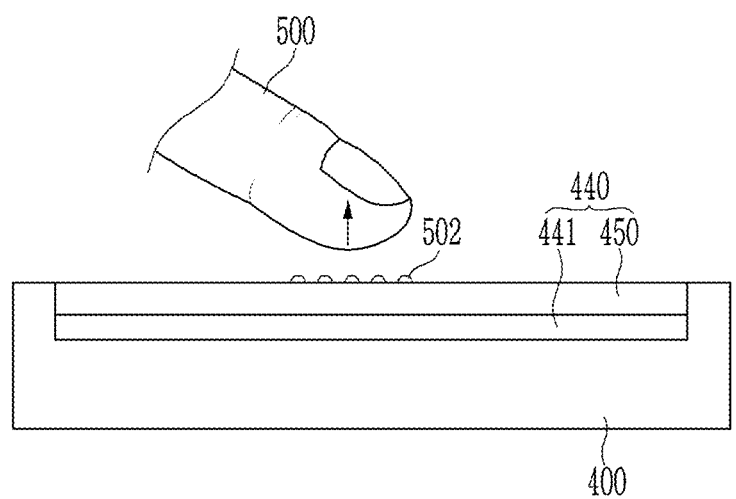
FIG. 5B is a cross-sectional view, along view line IVC-IVC' of FIG. 4B, of the electronic device of FIG. 4B according to some example embodiments.

FIG. 5A is a cross-sectional view, along view line IVC-IVC' of FIG. 4B, of the electronic device of FIG. 4B according to some example embodiments, and FIG. 5B is a cross-sectional view, along view line IVC-IVC' of FIG. 4B, of the electronic device of FIG. 4B according to some example embodiments.

As shown in FIGS. 5A-5B, a human finger 500 may move into contact with the outer surface 450S of the film 450 which defines an outer surface of the display device 440 (FIG. 5A) and may subsequently break contact with the outer surface 450S (FIG. 5B). As shown in FIG. 5B, the human finger 500 may deposit residue 502 on the outer surface 450S based on contact between the human finger 500 and the outer surface 450S. Such residue 502 may define a pattern that corresponds to an outer surface of the human finger. Accordingly, the residue 502 may, in some example embodiments, define and/or comprise a "fingerprint" as the term is commonly known, such that the residue 502 may be simply referred to as "material" comprising a fingerprint. Additionally, the residue 502 at least partially comprising a fingerprint may be simply referred to as a fingerprint.

In some example embodiments, the residue 502 (which may also be referred to as the fingerprint) may include various substances, including oils, skin debris, fats, or the like. As noted above, the film 450 may include a composition that configures the film 450 to have a surface energy that is equal to or greater than a surface energy of at least a main component of the residue (e.g., oleic acid). As a result of such configuration, the film 150 may be configured to enable reduced visibility, at least in visible wavelength ray regions, of the residue 502 to an observer that is observing the display panel 441 through the film 450 from an exterior of the electronic device 400.

Hereinafter, the embodiments are illustrated in more detail with reference to examples, including example embodiments of electronic devices 400 that are shown in FIGS. 4A-5B. However the inventive concepts are not limited to these example embodiments.

Synthesis Examples (Synthesis of First Material)

Synthesis Example 1-1

1 equivalent of 3-aminopropyl trimethoxysilane is added to 1 equivalent of perfluoropolyether methylester (Mw: 1,700 g/mol) and then, stirred for 16 hours at 50° C. to synthesize a first material represented by Chemical Formula 1-1E.

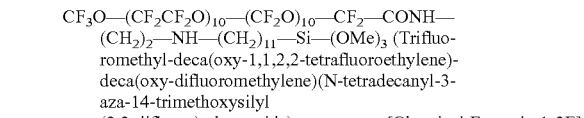

CF₃O—(CF₂CF₂O)₁₀—(CF₂O)₁₀—CF₂—CONH—(CH₂)₃—Si—(OMe)₃ (Trifluoromethyl-deca(oxy-1,1,2,2-tetrafluoroethylene)-deca(oxy-difluoromethyene)(N-propyl-3-trimethoxysilyl)(2,2-difluoro)ethanamide) [Chemical Formula 1-1E]

Synthesis Example 1-2

One equivalent of N-(2-aminoethyl)-11-aminoundecylt-rimethoxysilane is added to 1 equivalent of perfluoropo-lyether methylester (Mw: 1,700 g/mol) and then, stirred for 16 hours at 50° C. to synthesize a first material represented by Chemical Formula 1-2E.

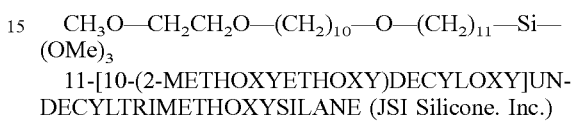

CF₃O—(CF₂CF₂O)₁₀—(CF₂O)₁₀—CF₂—CONH—(CH₂)₂—NH—(CH₂)₁₁—Si—(OMe)₃ (Trifluoromethyl-deca(oxy-1,1,2,2-tetrafluoroethylene)-deca(oxy-difluoromethylene)(N-tetradecanyl-3-aza-14-trimethoxysilyl(2,2-difluoro)ethanamide) [Chemical Formula 1-2E]

(Synthesis of Second Material)

Synthesis Example 2-1

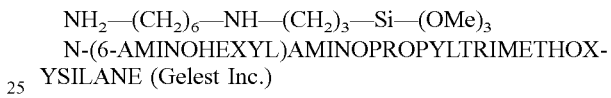

CH₃O—CH₂CH₂O—(CH₂)₁₀—O—(CH₂)₁₁—Si—(OMe)₃

11-[10-(2-METHOXYETHOXY)DECYLOXY]UN-DECYLTRIMETHOXYSILANE (JSI Silicone. Inc.)

Synthesis Example 2-2

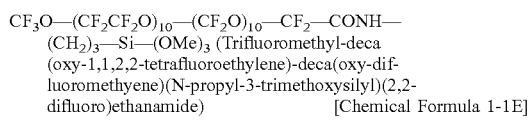

NH₂—(CH₂)₆—NH—(CH₂)₃—Si—(OMe)₃
N-(6-AMINOHEXYL)AMINOPROPYLTRIMETHOX-YSILANE (Gelest Inc.)

Examples

Example 1

The first material synthesized according to Synthesis Example 1-1 is added to and mixed with a Novec-7200 solvent (3M) at a concentration of 0.2 wt %, and the second material synthesized according to Synthesis Example 2-1 is added thereto to prepare a composition including the first and materials in a mole ratio of 0.53:99.47. Subsequently, the composition is spin-coated (wet-coated) on an organic substrate and dried on a hot plate at 115° C. for 10 minutes to form a 1 nm-thick film.

Example 2

A film is formed according to the same method as Example 1 except that the first and second materials are used in a mole ratio of 1.06:98.94 to prepare a composition.

Example 3

A film is formed according to the same method as Example 1 except that the first and second materials are used in a mole ratio of 2.62:97.38 to prepare a composition.

Example 4

A composition is prepared by using the first material synthesized according to Synthesis Example 1-1 and the second material synthesized according to Synthesis Example 2-1 in a mole ratio of 2.61:97.39. The first and second materials are mixed with a Novec-7200 solvent (3M) to be 20 wt % based on a total solid of the solution, and the mixed solution is dropped in a tablet including steel wool to prepare a dry coating sample. The composition is coated (dry-coated) on a glass substrate thermally deposited with 16 to 20 nm-thick SiO₂ by using a dry coating equipment to form a 5 nm-thick film.

Example 5

A composition is prepared according to the same method as Example 4 except that the first and second materials are used in a mole ratio of 1.06:98.94.

Comparative Example 1

A composition is prepared according to the same method as Example 1 except that the second material synthesized according to Synthesis Example 2-1 is used alone.

Comparative Example 2

A composition is prepared according to the same method as Example 1 except that the first and second materials are used in a mole ratio of 11.84:88.16.

Comparative Example 3

A composition is prepared according to the same method as Example 1 except that the first material synthesized according to Synthesis Example 1-1 is used alone.

Comparative Example 4

A composition is prepared according to the same method as Example 4 except that the first and second materials are used in a mole ratio of 5.08:94.94.

Comparative Example 5

A composition is prepared according to the same method as Example 1 except that a material synthesized according to Synthesis Example 1-2 instead of Synthesis Example 1-1 is used as the first material, and the first and second materials are used in a mole ratio of 7.83:92.17.

Comparative Example 6

A composition is prepared according to the same method as Example 1 except that the material synthesized according to Synthesis Example 1-2 instead of Synthesis Example 1-1 is used as the first material, and the first and second materials are used in a mole ratio of 14.53:85.47.

Comparative Example 7

A composition is prepared according to the same method as Example 1 except that the material synthesized according to Synthesis Example 1-2 instead of Synthesis Example 1-1 is used as the first material, and the first and second materials are used in a mole ratio of 25.37:74.63.

Comparative Example 8

A composition is prepared according to the same method as Example 1 except that the first material synthesized according to Synthesis Example 1-2 is used alone.

Comparative Example 9

A composition is prepared according to the same method as Example 1 except that the second material synthesized according to Synthesis Example 2-2 is used alone.

Comparative Example 10

A composition is prepared according to the same method as Example 1 except that the material synthesized according to Synthesis Example 2-2 instead of Synthesis Example 2-1 is used as the second material, and the first and second materials are used in a mole ratio of 5.46:94.54.

Comparative Example 11

A composition is prepared according to the same method as Example 1 except that the material synthesized according to Synthesis Example 2-2 instead of Synthesis Example 2-1 is used as the second material, and the first and second materials are used in a mole ratio of 12.62:87.38.

Comparative Example 12

A composition is prepared according to the same method as Example 1 except that the material synthesized according to Synthesis Example 2-2 instead of Synthesis Example 2-1 is used as the second material, and the first and second materials are used in a mole ratio of 22.42:77.58.

Evaluation

Evaluation I

Slip properties and fingerprint visibility of the films according to Examples 1 to 5 and Comparative Examples 1 to 12 are evaluated.

The slip properties of the films are evaluated by using a friction coefficient, and the fingerprint visibility of the films is evaluated by using an initial contact angle.

The friction coefficient is evaluated by sliding films according to some example embodiments with polyurethane and may be easily measured by using a friction coefficient evaluation equipment (Friction/peel tester/FPT-F1, PARAM, Labthink Instrumental, Inc.).

The initial contact angle is evaluated by using a Sessile drop technique and measured by dropping water and diiodomethane on each film with a Drop shape analyzer (DSA100, KRUSS, Germany).

The friction coefficient and initial contact angle evaluation results are shown in Table 1.

TABLE 1

| | Friction coefficient | Initial contact angle (°) (water) | Initial contact angle (°) (diiodomethane) |
|---|---|---|---|
| Example 1 | 0.498 | 74.6 | 49.4 |
| Example 2 | 0.486 | 75.0 | 51.3 |
| Example 3 | 0.448 | 83.1 | 57.5 |
| Example 4 | 0.28 | 83.0 | 56.7 |
| Example 5 | 0.32 | 80.4 | 51.0 |
| Comparative Example 1 | 0.561 | 73.9 | 47.1 |
| Comparative Example 2 | 0.233 | 111.8 | 96.5 |
| Comparative Example 3 | 0.127 | 116.7 | 100.8 |
| Comparative Example 4 | 0.221 | 96.0 | 76.2 |
| Comparative Example 5 | 0.515 | 86.7 | 85.0 |
| Comparative Example 6 | 0.505 | 93.6 | 96.5 |
| Comparative Example 7 | 0.292 | 104.3 | 97.8 |
| Comparative Example 8 | 0.124 | 111.6 | 99.6 |
| Comparative Example 9 | 1.22 | 62.7 | 52.8 |
| Comparative Example 10 | 1.114 | 106.7 | 57.5 |
| Comparative Example 11 | 0.717 | 113.8 | 78.8 |
| Comparative Example 12 | 0.723 | 114.3 | 96.5 |

Referring to Table 1, the films according to Examples 1 to 5 exhibit a small friction coefficient of less than or equal to 0.5 and simultaneously, maintain an initial contact angle within a particular (or, alternatively, predetermined) range and accordingly, exhibit excellent slip properties and fingerprint visibility compared with the films according to Comparative Examples 1 to 12.

Evaluation II

Surface energy of the films according to Example 1 to Example 5 and Comparative Example 1 to Comparative Example 12 is evaluated.

The surface energy of the films is calculated by the Owens-Wendt Method (geometric mean combining rule) based on DI contact angles and DM contact angles measured by the contact angle meter.

The surface energy evaluation result of the film is shown in Table 2.

TABLE 2

|  | Surface energy (mN/m) |
| --- | --- |
| Example 1 | 37.38 |
| Example 2 | 36.49 |
| Example 3 | 31.44 |
| Example 4 | 56.7 |
| Example 5 | 51.0 |
| Comparative Example 1 | 38.52 |
| Comparative Example 2 | 10.33 |
| Comparative Example 3 | 8.53 |
| Comparative Example 4 | 20.33 |
| Comparative Example 5 | 21.07 |
| Comparative Example 6 | 16.05 |
| Comparative Example 7 | 11.51 |
| Comparative Example 8 | 9.45 |
| Comparative Example 9 | 41.75 |
| Comparative Example 10 | 28.55 |
| Comparative Example 11 | 18.66 |
| Comparative Example 12 | 10.1 |

Referring to Table 2, the films according to Examples 1 to 5 have high surface energy than that (31 mN/in) of oleic acid, a main component of fingerprints compared with the films according to Comparative Examples 1 to 12, and accordingly, since the fingerprints on the films are not smudged, excellent fingerprint visibility may be easily obtained.

Evaluation III

Fluorine contents of the films according to Example 1 to Example 5 and Comparative Example 1 to Comparative Example 12 are evaluated.

The contents of fluorine atoms in the film are measured by X-ray photoelectron spectroscopy (XPS) (45°).

The surface energy measurement result of the films is shown in Table 3.

TABLE 3

|  | Fluorine (F) atom content (wt %) |
| --- | --- |
| Example 1 | 0.41 |
| Example 2 | 0.69 |
| Example 3 | 1.89 |
| Example 4 | 0.95 |
| Example 5 | 1.79 |
| Comparative Example 1 | 0.00 |
| Comparative Example 2 | 10.90 |
| Comparative Example 3 | 17.58 |
| Comparative Example 4 | 4.84 |
| Comparative Example 5 | 4.69 |
| Comparative Example 6 | 7.30 |
| Comparative Example 7 | 7.47 |
| Comparative Example 8 | 9.83 |
| Comparative Example 9 | 0.00 |
| Comparative Example 10 | 4.42 |
| Comparative Example 11 | 10.98 |
| Comparative Example 12 | 20.10 |

Referring to Table 3, the films according to Examples 1 to 5 include fluorine atom in an amount of greater than or equal to 0.4 wt % and thus exhibit excellent slip properties compared with those of Comparative Examples 1 to 12.

While this disclosure has been described in connection with what is presently considered to be practical example embodiments, it is to be understood that the inventive concepts are not limited to the disclosed example embodiments. On the contrary, it is intended to cover various modifications and equivalent arrangements included within the spirit and scope of the appended claims.

DESCRIPTION OF SYMBOLS

10A: functional layer
150: display panel
170: touch screen panel
1100, 200: display device

What is claimed is:

1. A surface coating material, comprising
a first material and a second material,
wherein the first material includes a linking group represented by Chemical Formula 1 between two terminal ends of the first material, where one terminal end of the two terminal ends of the first material is a trifluoroalkoxy group, and another terminal end of the two terminal ends of the first material is a silane group,
wherein the second material includes an oxyalkylene group or a *—NH—* linking group between two terminal ends of the second material, where one terminal end of the two terminal ends of the second material is an alkoxy group or an amino group, and another terminal end of the two terminal ends of the second material is a silane group, and
wherein the first material is included in the surface coating material in an amount of less than or equal to about 5 mol % relative to a total amount (100 mol %) of the first material and the second material in the surface coating material, $$*-(CF_2)_nO-* \qquad \text{[Chemical Formula 1]}$$

wherein, in Chemical Formula 1,
n is an integer of 1 to 10.

2. The surface coating material of claim 1, wherein the first material is represented by Chemical Formula 2, and
the second material is represented by Chemical Formula 3, $$CF_3O-[(CF_2)_{m1}O]_{m2}-(CF_2O)_{m3}-CF_2-CONH-L^1-(NH-L^2)_{m4}-SiR^aR^bR^c \qquad \text{[Chemical Formula 2]}$$

$$R^1-L^3-X^1-L^4-X^2-L^5-SiR^aR^bR^c \qquad \text{[Chemical Formula 3]}$$

wherein, in Chemical Formula 2 and Chemical Formula 3,
$L^1$, $L^2$, and $L^4$ are each independently a substituted or unsubstituted C1 to C20 alkylene group,
$L^3$ is *—$L^a$O—*, wherein $L^a$ is a substituted or unsubstituted C1 to C20 alkylene group, or $L^3$ is a substituted or unsubstituted C1 to C20 alkylene group,
$L^5$ is a single bond or a substituted or unsubstituted C1 to C20 alkylene group,
$R^1$ is an unsubstituted C1 to C20 alkoxy group or an amino group,
$X^1$ is *—NH—* or a single bond,
$X^2$ is oxygen or a single bond,
$R^a$, $R^b$, and $R^c$ are each independently hydrogen, a substituted or unsubstituted C1 to C20 alkoxy group, halogen, hydroxy group, amino group, a substituted or unsubstituted C1 to C20 alkyl group, a substituted or unsubstituted C6 to C20 aryl group, or a combination thereof, provided that at least one of $R^a$, $R^b$, or $R^c$ is a substituted or unsubstituted C1 to C20 alkoxy group, a halogen, or a hydroxy group, m1 is an integer of 2 to 10, m2 and m3 are each independently an integer of 1 or more, and m4 is an integer of 0 or 1.

3. The surface coating material of claim 1, wherein a weight average molecular weight of the first material is greater than a weight average molecular weight of the second material.

4. The surface coating material of claim 3, wherein the first material has a weight average molecular weight of about 1,500 g/mol to about 7,000 g/mol, and the second material has a weight average molecular weight of about 400 g/mol to about 800 g/mol.

5. The surface coating material of claim 1, wherein the surface coating material includes fluorine in greater than or equal to about 0.4 wt % relative to a total amount (100 wt %) of the first material and the second material in the surface coating material.

6. The surface coating material of claim 1, wherein a chain length of the first material is greater than a chain length of the second material.

7. The surface coating material of claim 1, wherein the first material and the second material each independently have a linear type structure.

8. A film, comprising:

a polymer of a first material and a polymer of a second material, wherein the first material includes a linking group represented by Chemical Formula 1 between two terminal ends of the first material, where one terminal end of the two terminal ends of the first material is a trifluoroalkoxy group, and another terminal end of the two terminal ends of the first material is a silane group, wherein the second material includes an oxyalkylene group or a *—NH—* linking group between two terminal ends of the second material, where one terminal end of the two terminal ends of the second material is an alkoxy group or an amino group, and another terminal end of the two terminal ends of the second material is a silane group, and wherein the first material is included in the film in an amount of less than or equal to about 5 mol % relative to a total amount (100 mol %) of the first material and the second material in the film,

*—(CF$_2$)$_n$O—*      [Chemical Formula 1]

wherein, in Chemical Formula 1, n is an integer of 1 to 10.

9. The film of claim 8, wherein the first material is represented by Chemical Formula 2, and the second material is represented by Chemical Formula 3, CF$_3$O—[(CF$_2$)$_{m1}$O]$_{m2}$—(CF$_2$O)$_{m3}$—CF$_2$—CONH-L$^1$-(NH-L$^2$)$_{m4}$-SiR$^a$R$^b$R$^c$      [Chemical Formula 2]

R$^1$-L$^3$-X$^1$-L$^4$-X$^2$-L$^5$-SiR$^a$R$^b$R$^c$      [Chemical Formula 3]

wherein, in Chemical Formula 2 and Chemical Formula 3, $L^1$, $L^2$, and $L^4$ are each independently a substituted or unsubstituted C1 to C20 alkylene group, $L^3$ is *—L$^a$O—*, wherein $L^a$ is a substituted or unsubstituted C1 to C20 alkylene group, or $L^3$ is a substituted or unsubstituted C1 to C20 alkylene group, $L^5$ is a single bond or a substituted or unsubstituted C1 to C20 alkylene group, $R^1$ is an unsubstituted C1 to C20 alkoxy group or an amino group, $X^1$ is *—NH—* or a single bond, $X^2$ is oxygen or a single bond, $R^a$, $R^b$, and $R^c$ are each independently hydrogen, a substituted or unsubstituted C1 to C20 alkoxy group, halogen, hydroxy group, amino group, a substituted or unsubstituted C1 to C20 alkyl group, a substituted or unsubstituted C6 to C20 aryl group, or a combination thereof, provided that at least one of $R^a$, $R^b$, or $R^c$ is a substituted or unsubstituted C1 to C20 alkoxy group, a halogen, or a hydroxy group, m1 is an integer of 2 to 10, m2 and m3 are each independently an integer of 1 or more, and m4 is an integer of 0 or 1.

10. The film of claim 8, wherein a weight average molecular weight of the first material is greater than a weight average molecular weight of the second material.

11. The film of claim 10, wherein the first material has a weight average molecular weight of about 1,500 g/mol to about 7,000 g/mol and the second material has a weight average molecular weight of about 400 g/mol to about 800 g/mol.

12. The film of claim 8, wherein the film includes fluorine in greater than or equal to about 0.4 wt % relative to a total amount (100 wt %) of the first material and the second material in the film.

13. The film of claim 8, wherein a chain length of the first material is greater than a chain length of the second material.

14. The film of claim 8, wherein the first material and the second material each independently have a linear type structure.

15. The film of claim 8, wherein the film has a surface energy of greater than or equal to about 31 mN/m.

16. The film of claim 8, wherein the film has a thickness of about 1 nm to about 20 nm.

17. A stacked structure, comprising:

a substrate, and the film of claim 8 on at least one surface of the substrate.

18. The stacked structure of claim 17, wherein the substrate is a ceramic or a glass plate.

19. A display device comprising the film of claim 8.

20. A display device comprising the stacked structure of claim 18.

21. An article comprising a glass substrate coated with the surface coating material of claim 1.

22. A display device, comprising:

a display panel configured to display an image; and a film on an outer surface of the display panel, the film including a first material and a second material, wherein the first material includes a linking group represented by Chemical Formula 1 between two terminal ends of the first material, where one terminal end of the two terminal ends of the first material is a trifluoroalkoxy group, and another terminal end of the two terminal ends of the first material is a silane group, and wherein the second material includes an oxyalkylene group or a *—NH—* linking group between two terminal ends of the second material, where one terminal end of the two terminal ends of the second material is an alkoxy group or an amino group, and another terminal end of the two terminal ends of the second material is a silane group, wherein the first material is included in the film in an amount of less than or equal to about 5 mol % relative to a total amount (100 mol %) of the first material and the second material in the film, $$*-(CF_2)_nO-* \qquad \text{[Chemical Formula 1]}$$

wherein, in Chemical Formula 1, n is an integer of 1 to 10.

23. The display device of claim 22, further comprising:
a touch screen panel between the film and the display panel.

24. An electronic device, comprising the display device of claim 22.

25. The electronic device of claim 24, wherein an outer surface of the film is substantially coplanar with one or more outer surfaces of the electronic device.

26. The electronic device of claim 25, wherein the one or more outer surfaces of the electronic device are directly adjacent to the film such that the outer surface of the film and the one or more outer surfaces of the electronic device collectively define a substantially continuous surface.

* * * * *